T. SLOPER.
HYDROAEROPLANE FLOAT AND HYDROPLANE.
APPLICATION FILED APR. 22, 1915.

1,152,058.

Patented Aug. 31, 1915.
4 SHEETS—SHEET 1.

Witnesses.
G. B. Bleming
Jesse B. Heller

Inventor.
Thomas Sloper
by Bakewell, Byrnes & Parmelee
Attys.

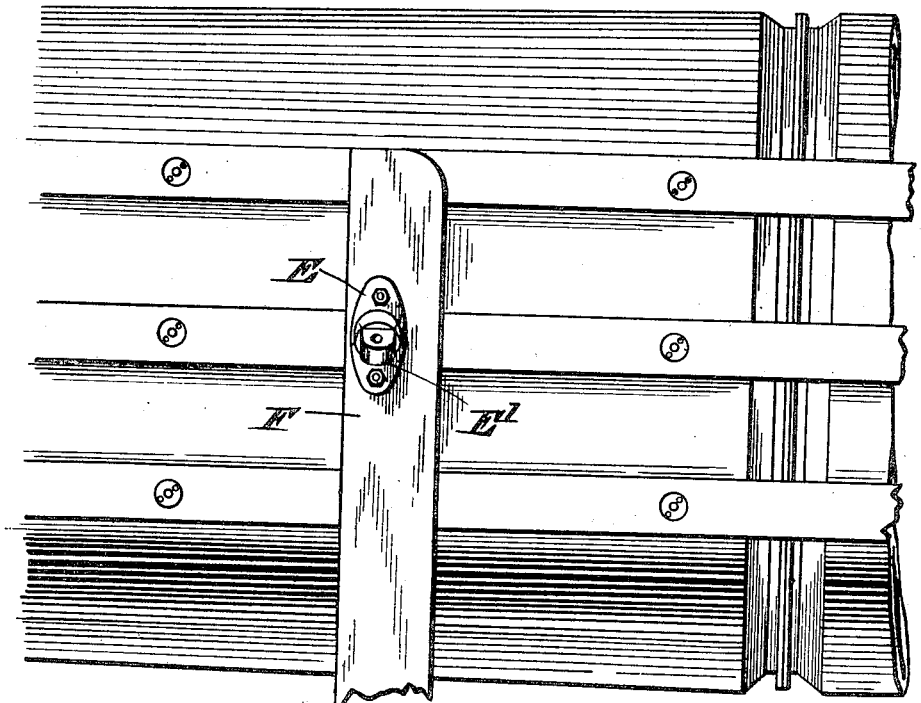
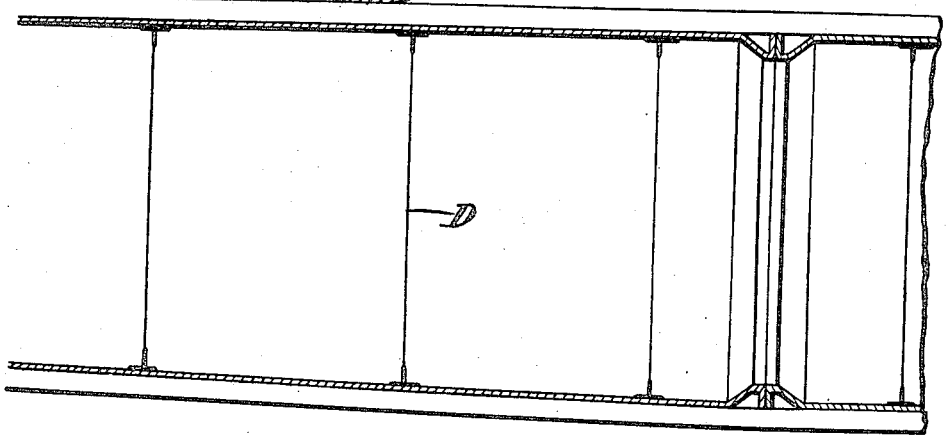

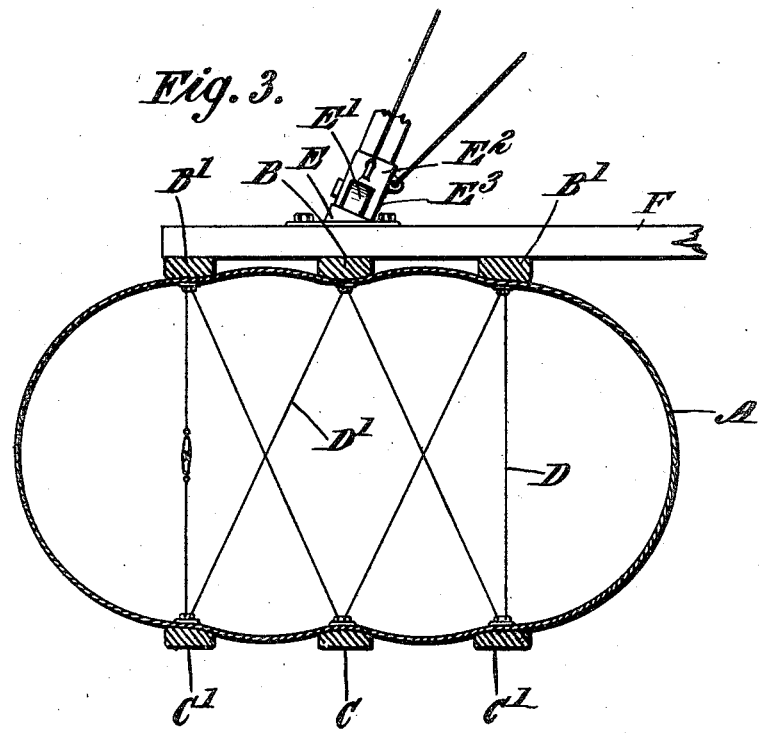
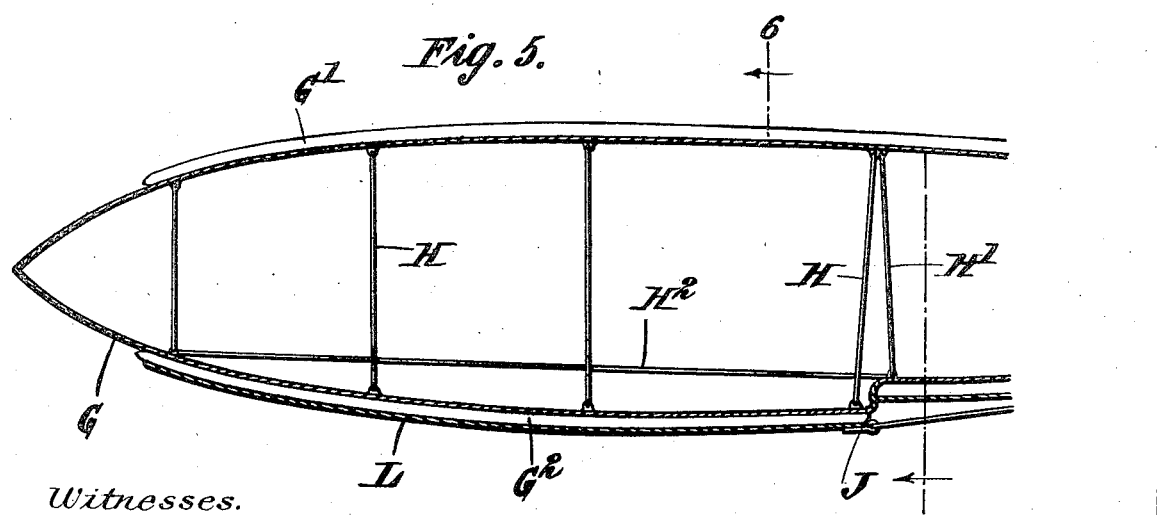

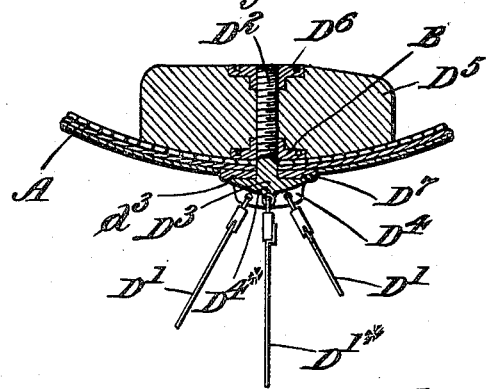
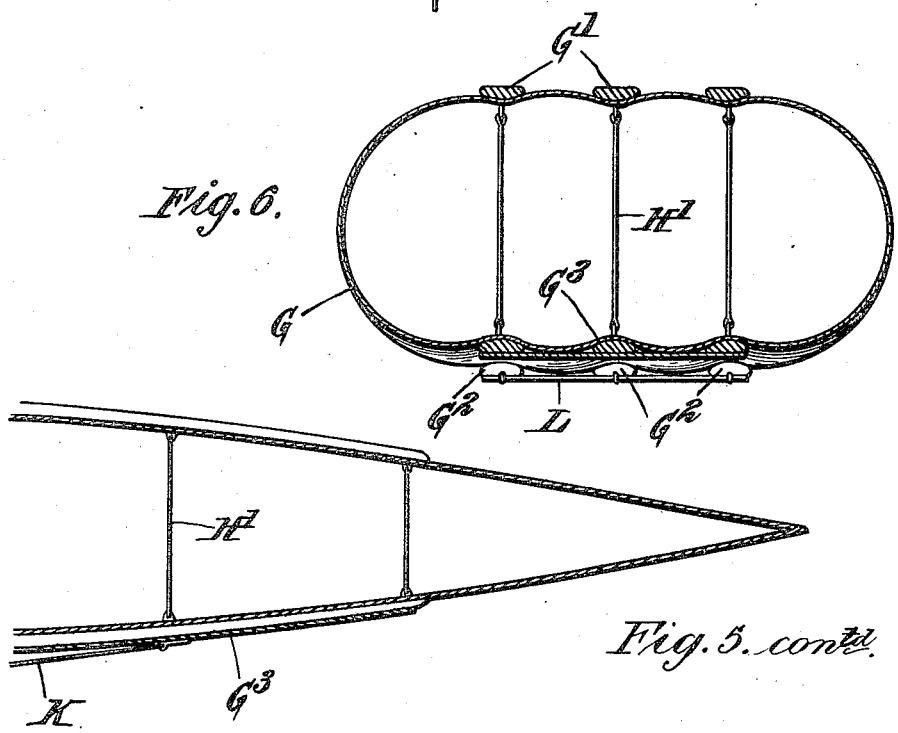

UNITED STATES PATENT OFFICE.

THOMAS SLOPER, OF DEVIZES, ENGLAND.

HYDROAEROPLANE-FLOAT AND HYDROPLANE.

1,152,058. Specification of Letters Patent. Patented Aug. 31, 1915.

Application filed April 22, 1915. Serial No. 23,070.

*To all whom it may concern:*

Be it known that I, THOMAS SLOPER, a subject of the King of England, residing at Devizes, Wiltshire, England, have invented certain new and useful Improvements in Hydroaeroplane-Floats and Hydroplanes, of which the following is a specification.

This invention is for improvements in or relating to hydro-aeroplane floats and hydroplanes of the type in which flexible material is employed for the walls, the float being made to retain its proper shape by inflation, and the object of the present invention is to provide a float of this type which will be subjected to less distortion when carrying the load than those heretofore proposed.

For convenience the invention will be described as applied to hydro-aeroplane floats.

It will be appreciated that when a float of elongated shape is inflated with gas under pressure, its transverse section becomes circular if the walls are unrestrained and such floats are more or less distorted when carrying the load, that is, when the hydro-aeroplane is resting thereon or when the float comes into violent contact with the water.

According to the present invention therefore a float of the type described and elongated in shape has the top and bottom walls held in by restraining means (for example internal ties) for the purpose of enabling the float to carry a given load with less distortion than would be the case if the float were left free to take a shape having an approximately circular transverse section.

Preferably the float is secured to the frame of the hydro-aeroplane by ties which extend therefrom, or from a part secured thereto, through the float to fixtures at the bottom of the float, and the ties if desired may be so arranged that they not only limit the outward movement of the top and bottom of the float, but also tend to prevent lateral displacement of the bottom relatively to the top. If desired, the arrangement of the tie-wires may be such as to produce a step on the underside such as is commonly provided in floats to enable them to leave the surface of the water more easily.

Figure 1:
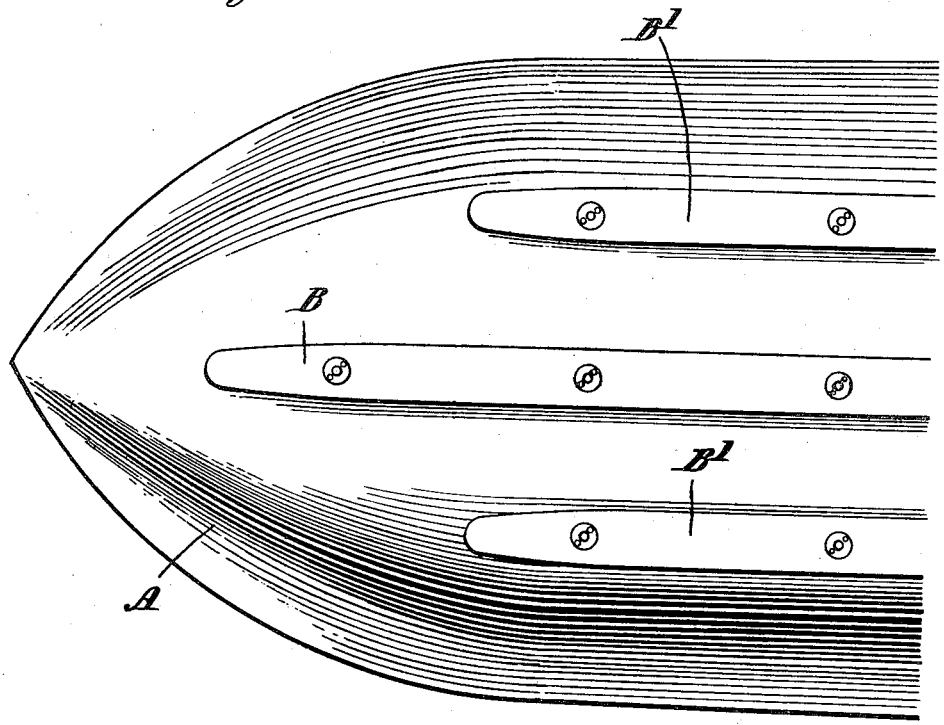
Figure 2:
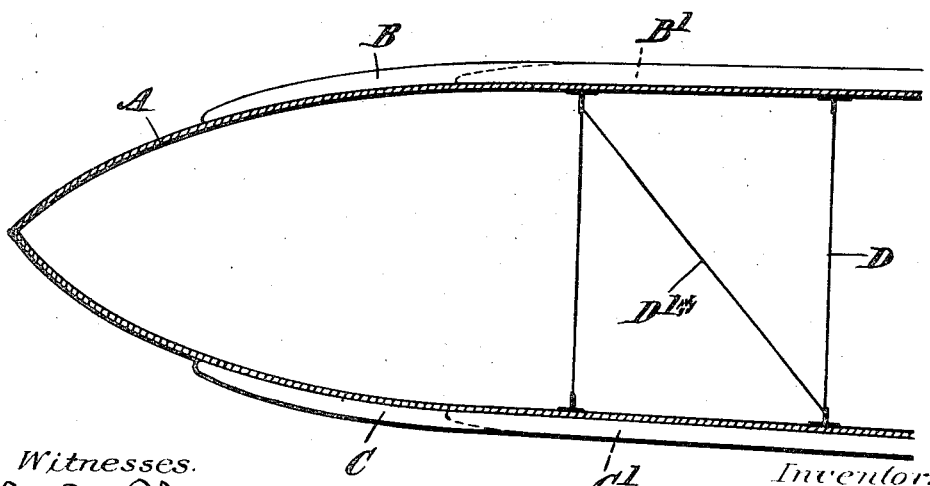

In the accompanying drawings—Figure 1 is a plan of the front portion of a float constructed according to one method of carrying out this invention; Fig. 2 is a vertical longitudinal section of the same; Fig. 3 is a transverse section through the same; Fig. 4 is a detail sectional view; Fig. 5 is a longitudinal section through a modified form of float according to the present invention, and Fig. 6 is a transverse section through the same on the line 6—6 of Fig. 5.

The same letters indicate the same parts throughout the drawings.

The float shown in the drawings comprises an elongated chamber A having tapered ends and built up of rubbered material according to my earlier United States patent specification No. 1,118,451 dated 24th November 1914, "Flexible joint."

At the top and bottom of the float are longitudinal battens B, $B^1$ and C, $C^1$ respectively. The battens B and C are centrally situated and are longer than the battens $B^1$ and $C^1$, so that they serve to stiffen the tapered end of the chamber A. If the chamber were unrestrained, it would of course take a cylindrical form when inflated, but to prevent this, vertical and diagonal tie-wires D, $D^1$ respectively, are provided between the battens B, $B^1$ and C, $C^1$. The wires are of such length that the bottom and top of the chamber are so held relative to each other that the chamber is made to take an approximately oval form in cross-section, as shown in Fig. 3. This flattening of the chamber at the top and bottom enables the float to carry greater loads with less distortion than would be the case if the chamber were allowed to take a cylindrical form, and moreover the float when thus restrained by tie-wires has less tendency to roll, as it will be appreciated that the wires $D^1$ in addition to tying in the bottom, prevent movement of the bottom laterally relatively to the top.

Another advantage afforded by the ties D, $D^1$ is that when the float is lifted by the hydro-aeroplane rising from the water, the float is supported from beneath by the battens C, $C^1$ instead of being hung from the frame by the top battens or whatever means might be employed to connect the float to the frame of the machine.

The battens B, $B^1$ are conveniently connected to the frame by fittings E (one only being shown in the drawings) carried on cross-members F rigidly secured to the battens. Each fitting E has a lug $E^1$ which enters the jaw of a fitting E² on one of the frame-members, the two parts being connected by a pivot-pin E³. The object of making the fittings in the form of a hinge is to allow a little rocking movement between the frame and the float so that a certain amount of distortion of the floats and adjacent parts can be permitted without putting undue strain upon their connection with the frame of the hydro-aeroplane.

The tie-wires D, D¹ may be connected by any convenient means to the battens, and in Fig. 4 a central batten B is shown in section at the point where a fastening enters it. The fastening comprises a bolt D² having a head D³ on which is a web D⁴. The head is put on the inside of the wall of the float-chamber A and the bolt extends through the wall and through the batten. It is secured in the batten by nuts D⁵, D⁶ seated in recesses in opposite sides of the batten. Between the head of the bolt and the wall of the float is a washer D⁷ which may be of rubber so as to form a seal between the head and the wall of the float, and that side of the head D³ which is against the washer may be ribbed as at $d^3$ so as to enable it to bed itself in the washer and prevent any leakage of gas between these two parts.

The web D⁴ is perforated to receive the wires D¹. Such a fastening as that shown in Fig. 4 may be used for all the wires, the web being perforated or shaped according to requirements.

In addition to the ties D, D¹, other ties may be employed to stiffen any part where required, for example in Fig. 2 a tie D¹* is shown connecting the forward upper part of the chamber A with the lower part at a point farther from the tapered end. This tends to take strains put upon the end of the float when striking the water. This wire D¹* may also be connected to a fitting such as is shown in Fig. 4, and in that fitting a web D⁴* is indicated at right-angles to the web D⁴ and the wire D¹* is engaged with this second web.

When desired a step may be provided on the underside of the float. A float so arranged is shown in Figs. 5 and 6 where the chamber G made as already described is provided with top battens G¹ and two sets of bottom battens G² and G³ respectively. The top battens extend along the length of the float without any break, but the bottom battens G² only extend part way along the float and are then followed by the battens G³, and the forward ends of the battens G³ are placed higher than the back ends of the battens G². The tie-wires H between the battens G¹ and G² are made of such length as to keep the battens G² in the positions shown in the figure, and the tie-wires H¹ are so graded in length as to keep the forward end of the battens G³ up above the back end of the battens G². A step is thus provided at J where the fabric of the chamber drops down from the battens G³ to the battens G².

To prevent the forward end of the float from turning up under the air-pressure, one or more ties H² is provided which connect the bottom forward portion of the float to the top of the step, that is, the end of the battens G³. The tie or ties H² thus hold the front end in which otherwise would be pushed forward as the air-pressure attempted to straighten out the step J. The step J may be further strengthened by external ties such as K connecting the battens G² to the battens G³.

Beneath the battens of any of the floats made according to this invention, plates L may be secured to prevent abrasion of the floats when being beached.

Obviously any number of battens may be employed these being variously placed according to requirements, also the tie-wires may be variously arranged according to the construction of the chamber and the shape it is required to keep.

What I claim as my invention and desire to secure by Letters patent is:—

1. In a hydro-aeroplane float whose walls are of flexible material and whose shape is elongated and maintained by inflation, the combination with the walls, of restraining means therefor whereby certain parts are held in closer to one another than would be the case if they were allowed free play under the pneumatic pressure, for the purpose set forth.

2. In a hydro-aeroplane float whose walls are of flexible material and whose shape is elongated and maintained by inflation, the combination with the top and bottom walls, which would tend with the sides to form a complete circle in transverse section under the pneumatic pressure, of restraining means whereby these parts are held in relatively to one another so that the float is flattened top and bottom, for the purpose set forth.

3. In a hydro-aeroplane float whose walls are of flexible material and whose shape is elongated and maintained by inflation, the combination with the top and bottom walls, which would tend with the sides to form a complete circle in transverse section under the pneumatic pressure, of ties within the float, fixtures for the bottom ends of the ties secured beneath the bottom of the float, frame members of the hydro-aeroplane above the float, and fixtures operatively connecting the upper ends of said ties to the frame of the hydro-aeroplane whereby the ties constitute the means for securing the float to the frame of the hydro-aeroplane and further serve as restraining means whereby the top and bottom are held in relatively to one another so that the float is flattened top and bottom, for the purpose set forth.

4. In a hydro-aeroplane float whose walls are of flexible material and whose shape is elongated and maintained by inflation, the combination with the top and bottom walls, which would tend with the sides to form a complete circle in transverse section, under the pneumatic pressure, of restraining means whereby these parts are held in relatively to one another so that the float is flattened top and bottom, such restraining means being further so arranged as to hold the bottom of the float against lateral displacement relatively to the top of the float, for the purpose set forth.

5. In a hydro-aeroplane float whose walls are of flexible material and whose shape is elongated and maintained by inflation, the combination with the top and bottom walls, which would tend with the sides to form a complete circle in transverse section under the pneumatic pressure, of ties within the float, a plurality of longitudinally-disposed battens beneath the float the bottom ends of the ties being carried through the wall of the float and operatively secured to the said battens, and a plurality of longitudinally-disposed battens above the float the upper ends of the said ties being carried through the wall of the float and operatively secured to these upper battens, the said upper battens forming part of the frame of the hydro-aeroplane whereby the top and bottom are held in relatively to one another, so that the float is flattened top and bottom, for the purpose set forth.

6. In a hydro-aeroplane float whose walls are of flexible material and whose shape is elongated and maintained by inflation, the combination with the top and bottom walls, which would tend with the sides to form a complete circle in transverse section under the pneumatic pressure, of restraining means whereby these parts are held in relatively to one another so that the float is flattened top and bottom, and a rearwardly facing step transverse to the direction of length of the float is provided on the under-side of the float, for the purpose set forth.

7. In a hydro-aeroplane float whose walls are of flexible material and whose shape is elongated and maintained by inflation, the combination with the top and bottom walls, which would tend with the sides to form a complete circle in transverse section under the pneumatic pressure, of ties within the float, a plurality of longitudinally-disposed battens beneath the float, the said battens being divided transversely along a line transverse to the longitudinal direction of the float at a point where it is desired to form a step on the under-side of the float and the ends of the battens at this point being separated a distance approximately equal to the depth it is desired the step shall have, the bottom ends of the ties being carried through the wall of the float and operatively secured to the said battens, a plurality of longitudinally-disposed battens at the top of the float, the upper ends of the said ties being carried through the wall of the float and operatively secured to these battens, the said upper battens forming part of the frame of the hydro-aeroplane whereby these parts are held in relatively to one another so that the float is flattened top and bottom, such restraining means being further so arranged as to hold the bottom of the float against lateral displacement relatively to the top of the float, and further longitudinally disposed ties operatively connecting the two halves of each divided bottom batten so that the divided ends are brought approximately into vertical alinement with each other whereby when the float is flattened a step is formed along this dividing line, the ties whereby the flattening of the float is obtained being adjusted in length to allow for the said step, for the purpose set forth.

In testimony whereof I have signed my name to this specification in the presence of two subscribing witnesses.

THOMAS SLOPER.

Witnesses:
 HARRY S. SLEDGE,
 STANLEY R. MOORE.